UNITED STATES PATENT OFFICE.

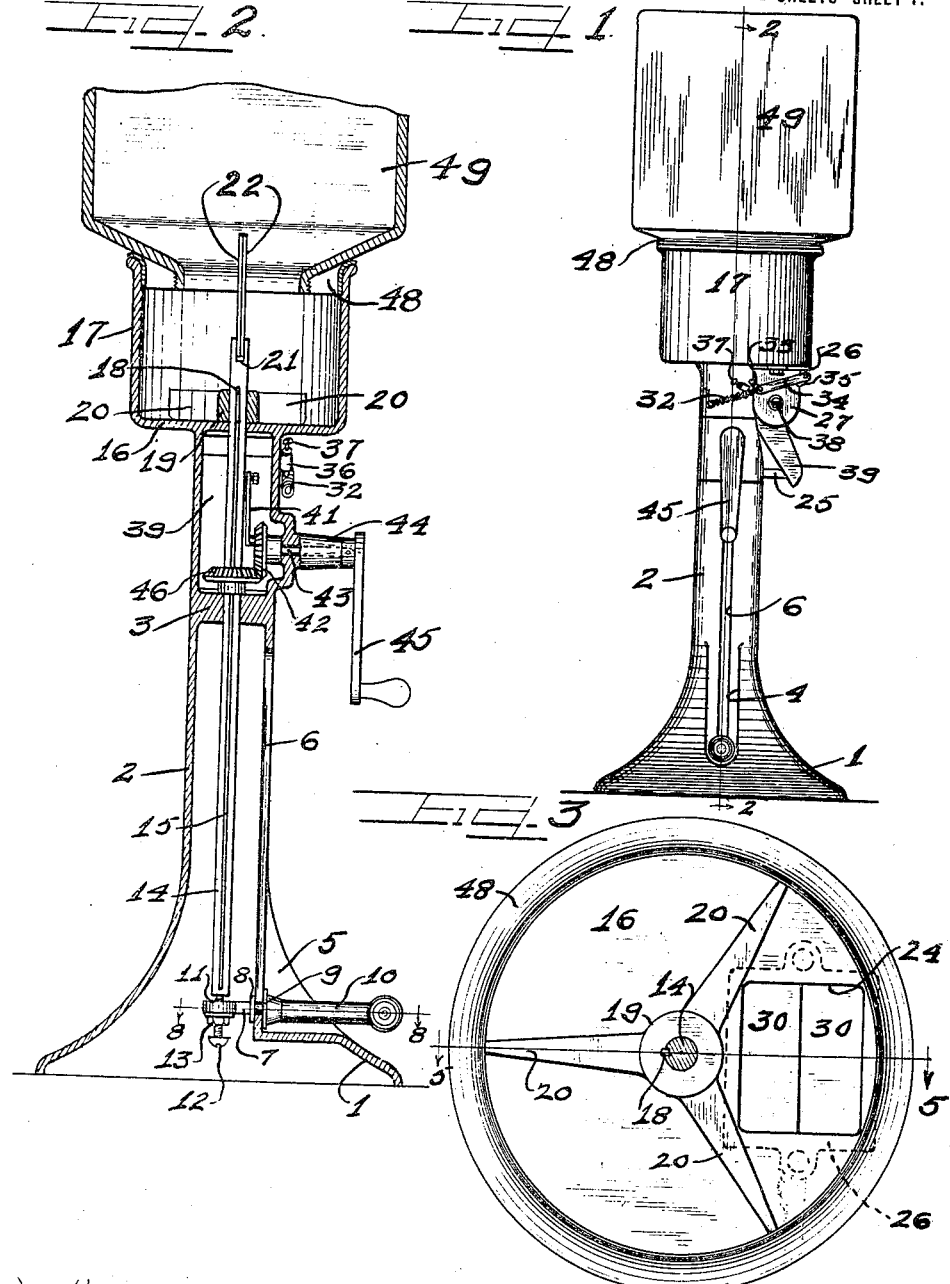

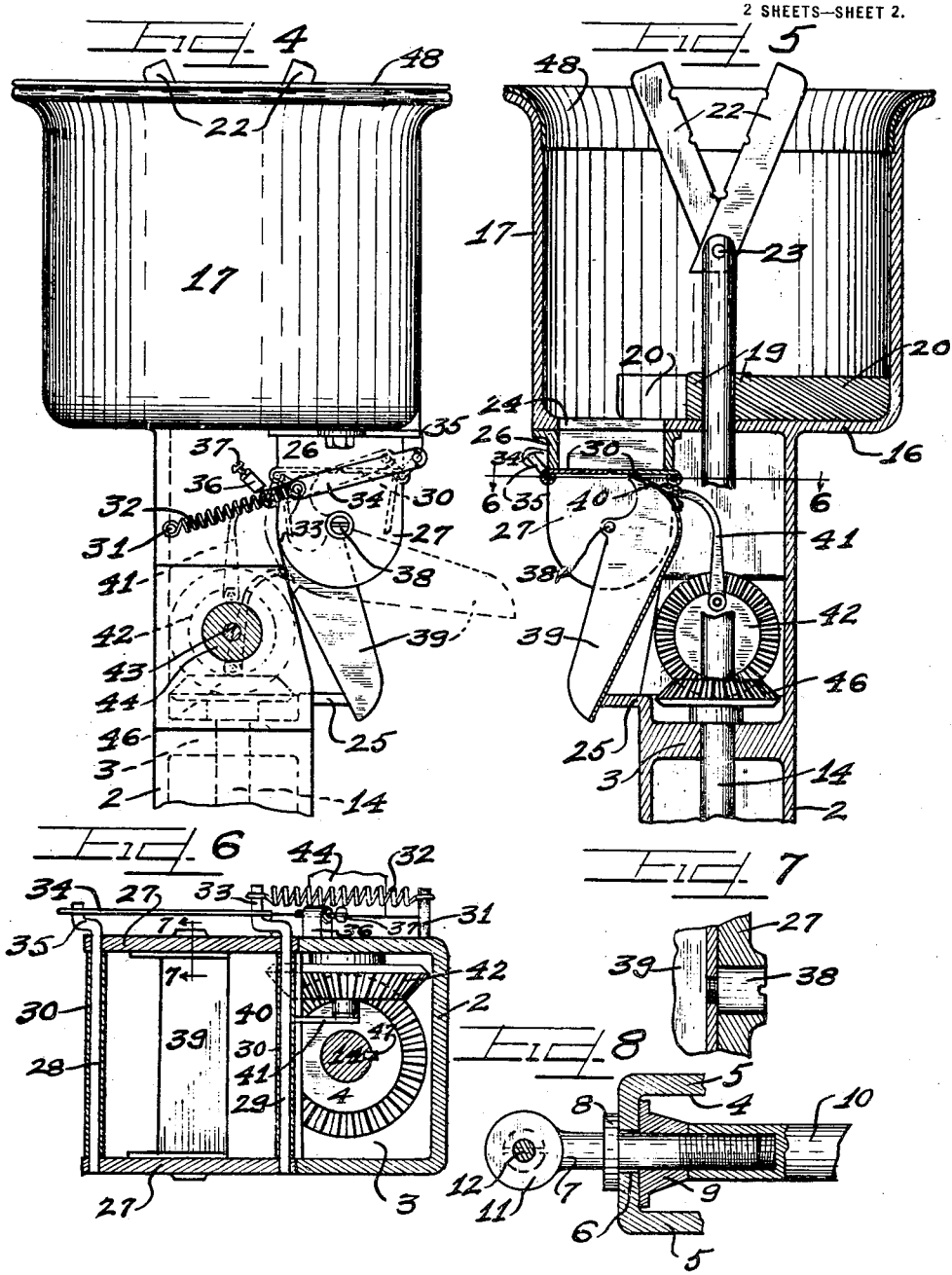

GEORGE L. RICHARDSON AND WALTER E. RICHARDSON, OF CHICAGO, ILLINOIS.

DISPENSER.

1,373,973.  Specification of Letters Patent.  Patented Apr. 5, 1921.

Application filed May 2, 1918. Serial No. 232,004.

*To all whom it may concern:*

Be it known that we, GEORGE L. RICHARDSON and WALTER E. RICHARDSON, citizens of the United States, and residents of the city of Chicago, in the county of Cook and State of Illinois, have invented new and useful Improvements in Dispensers; and we do hereby declare that the following is a full, clear, and exact description of the same, reference being had to the accompanying drawings, and to the numerals of reference marked thereon, which form a part of this specification.

Powdered malted milk, which is usually put up in bottles, is used extensively in the making of malted milk drinks, which require a certain amount of malted milk powder. In mixing the ingredients of a malted milk drink, difficulty is experienced in measuring by means of a spoon, the proper amount of powdered malted milk to be used, and the amount of powdered malted milk used is therefore usually guessed at.

This invention relates to an improved form of a dispenser adapted to apportion out a predetermined quantity of a material.

It is an object of this invention to construct a dispenser for powdered malted milk or similar materials, wherein a predetermined quantity of powdered malted milk is dispensed by a simple operation of the dispenser.

It is also an object of the invention to produce a dispenser wherein a material is adapted to be broken up and dispensed in predetermined quantities.

Another object of the invention is to provide a malted milk dispenser wherein the rotation of a mechanism causes simultaneous loosening up of a material and an apportioning of a certain amount thereof.

It is a further object of the invention to construct a material dispenser wherein a receiving and a dispensing scoop is adapted to be operated to control the opening and closing of doors which govern the amount of material to be deposited in said scoop.

It is furthermore an object of this invention to provide a material dispenser wherein automatically opening material controlling doors are controlled by a manually actuatable material receiving mechanism.

It is an important object of this invention to provide a device of simple and effective construction adapted to dispense a predetermined quantity of a material by a simple operation of the device, which operation also serves to agitate the material to prevent caking thereof before being dispensed.

Other and further important objects of this invention will be apparent from the disclosures in the specification and drawings.

The invention (in a preferred form) is illustrated in the drawings and hereinafter more fully described.

On the drawings:

Figure 1 is an elevational view of a dispenser embodying the principles of this invention.

Fig. 2 is an enlarged section taken on line 2—2, of Fig. 1, with parts in elevation and with part broken away.

Fig. 3 is a top plan view of the device with the bottle removed.

Fig. 4 is an enlarged elevational side view of the upper portion of the device showing the operation in dotted lines.

Fig. 5 is an enlarged section taken on line 5—5, of Fig. 3, with parts shown in elevation.

Fig. 6 is an enlarged detail section taken on line 6—6, of Fig. 5.

Fig. 7 is an enlarged fragmentary detail section taken on line 7—7, of Fig. 6, with parts in elevation.

Fig. 8 is an enlarged fragmentary detail section taken on line 8—8, of Fig. 2, with parts shown in elevation and with parts broken away.

As shown on the drawings:

The reference numeral 1, designates a base having integrally formed thereon a vertical hollow pedestal, standard or tube 2, provided with a horizontal centrally apertured partition 3, integrally formed or rigidly secured transversely therein near the upper end thereof. Formed in one side of the base 1, is a recess 4, formed by a pair of parallel webs or plates 5, which are integrally connected with the standard 2 and the base 1. Provided in the standard 2, is a long vertical guide slot 6, the lower end of which extends down into the rear wall forming the recess 4, to afford a means to permit a threaded bolt or pintle 7, to project outwardly therethrough. A flange plate or stop 8, is integrally formed on the bolt 7, adjacent the inner surface of the standard 2, to limit the outward movement of the bolt. Engaged upon the projecting end of the bolt 7, is a clamping collar or ring 9. Removably threaded upon the extending outer threaded end of the bolt 7, to the outside of the clamping collar 9, is a handle 10, adapted to move the bolt 7, upwardly or downwardly in the slot 6, and also adapted to tightly thread onto the bolt 7, to engage the outer end of the collar 9, to clamp the same against the outer surface of the standard 2, to hold the bolt clamped against movement in an adjusted position. Integrally formed on the inner end of the bolt 7, is a flat head 11, provided with a threaded passage to permit a bearing or set screw 12, to be adjustably threaded therethrough and be locked in an adjusted position by a lock nut 13. The upper projecting end of the set screw 12, affords a bearing point upon which the lower end of a vertical shaft 14, rotatably rests.

The shaft 14, is provided with a longitudinal groove or key-way 15, and the shaft extends upwardly through the partition plate 3, and through an aperture provided for the purpose in the middle of a bottom plate 16, of a cup, reservoir or hopper 17, which is integrally formed or rigidly secured upon the upper end of the standard 2, to close the same. Secured to the shaft 14, by means of a key 18, which slidably seats in the keyway 15, is a spider embracing a hub 19, and a plurality of radially directed blades or arms 20, integrally formed thereon. The spider is disposed within the cup 17, directly above the bottom plate 16. The upper end of the shaft 14, is provided with a slot 21, to receive the inner ends of a pair of parallel agitating arms or blades 22, pivotally mounted upon a pin 23, secured transversely in the upper end of the shaft 14, to pass through the slot 21.

Formed in the bottom plate 16, is a discharge opening 24. The standard 2, above the partition plate 3, is open at one side, and is provided with an integral outwardly projecting flange or stop 25, disposed below the opening 24. Secured to the bottom of the bottom plate 16, to register with the opening 24, is a rectangular frame or chute 26, provided with a pair of parallel oppositely disposed side plates 27, which are integral with or are extensions of two of the sides of said chute 26. The inner edges of the side plates 27, contact the edges of the side walls of the open portion of the standard 2, in which position the side plates 27, are disposed in the planes of the respective side walls of the standard. Rotatably projecting through suitable apertures in the side plates 27, directly below the front and rear walls of the chute frame 26, is a front and a rear pintle 28 and 29, respectively, upon each of which is secured, between the side plates 27, a shutter or door 30, which in closed horizontal position are adapted to contact one another to close the bottom of the chute 26.

Rigidly secured on one side of the upper portion of the standard 2, is a pin 31, to which one end of a coil spring 32 is connected. The other end of the spring 32, is engaged on a crank arm 33, integrally formed on one end of the rear door pintle 29. Also pivotally engaged on the crank arm 33, to the inside of the spring 32, is one end of a bar 34, the other end of which is pivotally engaged on a crank arm 35, integrally formed on one end of the front door pintle 28. Secured upon one side of the upper portion of the standard 2, to the rear of the crank arm 33, is a lug 36, provided with a threaded passage to permit a controlling or set screw 37, to be adjustably threaded therethrough to afford a means for limiting the movement of the bar 34, and consequently controlling the amount of opening of the doors 30.

Pivotally mounted by means of stub screws 38, between the side plates 27, is a scoop, shovel or tray 39, the inner end of which curves upwardly and is closed as denoted by the reference numeral 40, while the outer end of said tray 39, is open and is longer than the inner end and in lowered position is adapted to contact the flange stop 25, which limits the downward movement of said tray, as clearly shown in Fig. 5. Connected pivotally to the back of the inner end of the tray 39, is the upper curved end of a toggle or link 41, the lower end of which is pivotally connected eccentrically to the inner surface of a bevel gear or pinion 42, secured on the inner end of a stub axle or shaft 43, rotatably journaled in a hub extension 44, integrally formed on one side of the upper portion of the standard 2, above the partition plate 3. Secured on the outer projecting end of the axle 43, is a crank or handle 45, for rotating the axle and the bevel gear 42, secured on the inner end thereof, which gear is in mesh with a bevel gear or pinion 46, engaged on the main shaft 14, directly above the partition plate 3, by means of a key 47, slidably seated in the keyway 15, of said main shaft 14.

Removably engaged over or seated upon the rim of the cup 17, is a resilient washer or ring 48, made of rubber or other suitable material, to permit the shoulders of an inverted bottle, can or other receptacle 49, to rest thereon, with the blades 22, positioned to project into the bottle through the open mouth thereof. The receptacle 49, contains a material to be dispensed, such as powdered malted milk, sugar, a condiment, grain or any desired material to be apportioned in predetermined quantities. The powdered malted milk from the inverted bottle 49, falls into the cup 17, to practically fill the same.

The operation is as follows:

With the parts in normal position as shown in Figs. 1 and 5, and with the malted milk bottle seated in inverted position upon the washer 48, to permit the powdered malted milk to practically fill the hopper 17, a predetermined quantity of the malted milk may be dispensed as follows. The crank handle 45, is rotated upwardly a half turn, thereby rotating the gear 42, and causing the eccentrically mounted link 41, to move downwardly with said gear to exert a downward pull on the rear end 40, of the tray 39, to move the same upwardly into the dotted line position shown in Fig. 4.

Normally the doors 30, are held in horizontal closed position to close the lower end of the chute 26, by means of the inner end 40, of the tray, which engages beneath one of said doors. In the closed position of the doors 30, the connecting bar 34, is in its uppermost position with the spring 32, tensioned. By rotating the gear 42, the inner end 40, is moved out of engagement with the doors 30, thus permitting the tensioned spring 32, to act automatically to exert a pull on the bar 34, thus rotating the crank handles 33 and 35 and the respective doors 30, secured thereon, to swing said doors downwardly into open position until stopped by the stop screw 37, which limits the movement of the bar 34. Opening of the doors 30, permits the powdered malted milk to pass downwardly through the opening 24 and through the chute 26, to deposit a predetermined quantity of the malted milk in the tray 39. The crank handle 45, is then rotated to complete the revolution, whereby the link 41, is moved upwardly forcing the inner end 40, of the tray 39, upwardly against the rear door to close the doors, and simultaneously lowering the outer end of the tray to permit the quantity of malted milk carried therein to be deposited in a glass or other receptacle held below the lower end of said tray.

Swinging the rear door 30, upwardly into closed position, of course rotates the door pintle 29, and the crank 33, thereof, thereby actuating the bar 34, which acts to rotate the crank 35, to simultaneously close the outer door 30. Rotation of the pintle crank 33, also acts to stress the spring 32, to permit automatic opening of the doors when the main handle 45, is pivotally rotated as already described.

Rotation of the gear 42, by the handle 45, also causes rotation of the gear 46, in mesh therewith, to transmit the drive to the main shaft 14, which is rotated on its screw bearing 12, and causes rotation of the spider in the hopper 17, the rotating arms 20 of which act to sweep the malted milk into the opening 24, and further serve as a means for breaking up any caking or lumps formed in the malted milk in the hopper. The blades 22, are also rotated by the rotation of the main shaft 14, and serve to keep the mouth or neck of the bottle 49, open against clogging.

By loosening the handle 10, the clamping washer 9, is released from clamping engagement with the standard 2. The handle 10, may then be raised, with the bolt 7, rising in the guide slot 6. Raising of the bolt 7, causes the main shaft 14, to slide upwardly through the partition plate 3, and the bottom plate 16, of the hopper 17, whereby the blades 22, are also raised. By rotating the handle 10, the bolt 7, may be clamped in any desired adjusted position to afford a suitable bearing for the main shaft 14. The blades 22, are elevated to permit the same to loosen the material in the bottle 49, which may have packed in the bottle to such an extent that the same will not feed downwardly by gravity to fill the hopper 17. The blades 22, are pivotally mounted on the upper end of the shaft 14, to permit the same to fall outwardly away from one another when the shaft 14, is elevated, or inwardly toward one another when the shaft 14 is lowered and the blades contact material or the neck of the bottle. It will thus be seen that rotation of the crank handle 45, causes rotation of the main shaft and thereby rotation of the spider arms 20, to sweep the material in the hopper 17, into the opening 24; rotation of the shaft 14, also causes rotation of the blades 22, which serve to loosen the material in the neck portion of the bottle 49, to permit the free passage of the material into the hopper.

By adjustment of the set screw 37, the movement of the bar 34, is controlled and thereby the opening of the doors 30, to permit different amounts of the material in the hopper 17, to fall upon the tray 39, when the crank handle is operated for different adjustments of said set screw. The tray is of sufficient length to prevent a pile of the material deposited thereon from sliding off of the tray when it is in elevated position.

It will of course be understood that any kind of material, such as sugar, condiments, flour, etc., may be dispensed in given quantities instead of powdered malted milk, and that if desired a plurality of dispensers may be used together, each dispensing a different material into a common mixer to produce a desired mixture containing a certain quantity of each of the materials dispensed.

We are aware that numerous details of construction may be varied through a wide range without departing from the principles of this invention, and we therefore do not purpose limiting the patent granted otherwise than necessitated by the prior art.

We claim as our invention:

1. A material dispenser embracing a container having a discharge opening therein, doors for closing said opening, a tray pivotally mounted on said container below said doors for normally engaging and holding the doors in closed position, means for moving the tray to open said doors including a link pivoted to the upper end of the tray, said link being eccentrically mounted on the tray operating means, so that in one position it moves the tray to allow the doors to open and in its other position it moves the tray to close the doors.

2. A material dispenser comprising a container having a discharge opening therein, doors for closing said opening, a tray pivotally mounted on said container for normally engaging and holding the doors in closed position, a gear operated eccentric mechanism connected with said tray for actuating the tray to move the same out of engagement with said doors, and spring controlling means connected with said doors for automatically opening the same when said tray is moved into receiving position to permit a predetermined quantity of the material to be dispensed.

3. A material dispenser comprising a container having a discharge opening therein, doors for closing the same, a mechanism connected with said doors adapted to move the same into open position, a gravity acting material receiving tray pivotally mounted on the container and normally positioned to engage and hold said doors in closed position, a link pivotally connected to said tray, and a gear mechanism to which said link is eccentrically connected, said gear mechanism and link adapted to be operated to move said tray into a receiving position to release said doors to permit the same to be opened by said door controlling mechanism whereby a predetermined quantity of the material is deposited in said tray.

4. A material dispenser embracing a container having a discharge opening therein, means for closing said opening, material receiving means for normally engaging and holding said closure means in closed position, a gear mechanism, eccentric means connected with said gear mechanism and with said material receiving means for actuating said material receiving means to move the same out of engagement with said closure means, and means for automatically opening said closure means to permit a predetermined quantity of the material to be deposited upon said material receiving means.

5. A material dispenser comprising a container having an opening therein, a spider rotatably mounted within said container, means for closing said opening, material receiving means for governing the opening and the closing of said closure means, a link pivoted to the top of the material-receiving means, said link being eccentrically mounted on the spider-rotating means, and a mechanism adapted to simultaneously rotate said spider and actuate said material receiving means to permit a predetermined quantity of the material only to be deposited through said opening on said material receiving means.

6. A material dispenser comprising a hopper having an opening therein, doors for closing said opening, material receiving means for normally holding said doors in position to close said opening, mechanism for moving said receiving means into receiving position, and spring controlled crank arms connected with said doors for automatically opening said doors when said receiving means is moved into receiving position to permit a certain quantity of material from said hopper to be deposited through said opening upon said receiving means.

7. A dispenser embracing a material container having an opening therein, doors for closing said opening, a crank arm secured to each door, a bar connecting said crank arms, a receiving tray normally holding said doors in closed position, mechanism for moving said tray into receiving position, and spring means connected with one of said crank arms for opening said doors when said tray is moved into receiving position to permit a certain quantity of material to be deposited through said opening upon said tray, said mechanism adapted to return said tray to normal position to close said doors and discharge the quantity of material deposited thereon.

8. A dispenser of the class described comprising a material container having an opening therein, means for closing said opening, connected crank members secured to said means, a spring attached thereto, and a mechanism for controlling the opening and the closing of said means adapted to be moved into a position to permit said spring to actuate said crank members to open said means whereby a predetermined quantity of material is deposited through said opening upon said mechanism which is then returned to normal position to close said means and simultaneously discharge the deposited quantity of material.

9. A dispenser embracing a material container having an opening therein, doors for closing the opening, a receiving tray pivotally mounted below said doors normally holding said doors in closed position, and a manually actuated eccentric mechanism connected with said tray adapted by a single continuous operation to move said tray into a position to release said doors and receive a discharge of material from said container and then return said tray to normal position to simultaneously close said doors and dump the discharged material.

10. A dispenser comprising a material container having an opening therein, doors for closing the opening, a receiving tray pivotally mounted below said doors normally holding the same in closed position, eccentric means connected with said tray, and a mechanism for actuating said eccentric means to move said tray into a position to release said doors and receive a certain quantity of material from said container and then return said tray to normal position to simultaneously close said doors and dump the material deposited on said tray.

11. A dispenser comprising a material container having an opening therein, doors for closing said opening, a receiving means movably mounted below said doors normally holding the same in closed position, eccentric means connected with said receiving means, a mechanism for actuating said eccentric means to move said receiving means into a receiving position to release said doors, spring controlled crank means for automatically swinging said doors into open position when released by said receiving means to permit a predetermined quantity of the material in said container to be deposited through said opening upon said receiving means, said mechanism then adapted to continue to actuate said eccentric means to return said receiving means to normal position to simultaneously close said doors against the action of said spring controlled crank means and dump the material deposited upon said receiving means.

12. In a dispenser of the class described, a container having an opening therein, doors for closing said opening, said container being open at the upper end to permit a receptacle containing material to be dispensed to be seated in inverted position upon said container to permit the material to feed into said container by gravity, a tray movably mounted below said doors normally holding the same in closed position, an actuating mechanism, a member pivotally connected at one end to said tray and having the other end pivotally and eccentrically connected to said mechanism, said mechanism adapted to actuate said member to move said tray into a receiving position to release said doors, spring controlled means for automatically swinging the doors into open position when released by said tray, mechanisms within said container connected with said actuating mechanism adapted to be actuated simultaneously with said member, tray and doors to loosen the material in said receptacle and in said container and sweep a predetermined quantity of the material through said opening upon said tray, said actuating mechanism then adapted to continue to actuate said member to return said tray to normal position to simultaneously close said doors against the action of said spring controlled means and dump the material deposited upon said tray.

13. A dispenser comprising a standard, a material container secured thereon and having an opening therein, spring controlled means closing said opening, a receiving member movably mounted below said means to normally hold the same in closed position, stirring mechanisms within said container, and gear mechanisms within said standard connected with said member and with said stirring mechanisms adapted to simultaneously actuate the same to release said spring controlled means to cause a predetermined quantity of the material to be discharged through said opening and deposited upon said member, said gear mechanisms then adapted to return said member to normal position to dump the material and close said spring controlled means.

14. A dispenser comprising a standard, a material container mounted thereon, a shaft rotatably and adjustably mounted in said standard and projecting into said container, means within said container connected with said shaft, an actuating mechanism for said shaft and means to cause said means to break up the material in said container, and dispensing mechanisms connected with said container and with said actuating mechanism adapted to be operated by said actuating mechanism to cause discharge of a predetermined quantity of said material.

15. A material dispenser of the class described comprising an apertured hopper, doors for closing the aperture therein, vertically adjustable means projecting into said hopper, agitating blades pivotally mounted on the upper end of said means, a spider within said hopper connected with said means, a material receiving tray below said hopper, and mechanisms for simultaneously operating said means, blades, spider doors and tray for causing a given quantity of material in the hopper to be deposited upon said tray and then discharged therefrom.

16. In a material dispenser of the class described, means for supporting a material container to receive the material therefrom, mechanisms in said supporting means projecting into said container, means for rotating said mechanisms to loosen the material to cause the same to feed freely into said supporting means, and means for raising and lowering said mechanisms and adapted to hold the same in an adjusted position.

17. In a material dispenser of the class described, means for supporting a material container to receive the material therefrom, dispensing means on said supporting means, a shaft rotatably and slidably mounted in said supporting means, agitating members thereon, bearing means for supporting said shaft adapted to raise or lower said shaft and be clamped in an adjusted position on said supporting means to permit the agitating members to engage the material in any position in said container, and means connected with said shaft and with said dispensing means adapted to rotate said shaft and members to loosen the material and actuate said dispensing means to cause a predetermined quantity of the material to be dispensed.

In testimony whereof, we have hereunto subscribed our names in the presence of two subscribing witnesses.

GEORGE L. RICHARDSON.
WALTER E. RICHARDSON.

Witnesses:
CHARLES W. HILLS, Jr.,
FRED E. PAESLER.